May 1, 1962 L. E. LARSSON ET AL 3,031,886
APPARATUS FOR AND METHOD OF FATIGUE TESTING MATERIALS
Filed Aug. 14, 1957 5 Sheets-Sheet 1

INVENTOR

BY Curtis, Morris & Safford
ATTORNEYS

May 1, 1962    L. E. LARSSON ET AL    3,031,886
APPARATUS FOR AND METHOD OF FATIGUE TESTING MATERIALS
Filed Aug. 14, 1957    5 Sheets-Sheet 2

INVENTOR

BY Curtis, Morris & Safford
ATTORNEYS

3,031,886
APPARATUS FOR AND METHOD OF FATIGUE TESTING MATERIALS
Lars E. Larsson, 5675 Royalmount Ave., Montreal, Quebec, Canada, and Erik G. Lundin, Sandviken, Sweden
Filed Aug. 14, 1957, Ser. No. 678,081
5 Claims. (Cl. 73—91)

This invention relates to apparatus for fatigue testing materials to bending stresses and an improved method of fatigue testing strip materials. This invention is more particularly directed to an improved apparatus for fatigue testing a specimen of material by supporting means which alternately uniformly fold the ends of the specimen towards each other alternately to opposite sides of a central straight condition and back to the straight condition at a substantially uniform rate while allowing the specimen to adjust its relative longitudinal point of support on the supporting means and maintaining the stress in the specimen within a substantially predetermined test zone. The method of accomplishing this repetitive stressing of a test specimen is not limited to a particular apparatus and includes the novel feature of maintaining the stress zone in a substantially predetermined section of the specimen while allowing relative longitudinal movement between the specimen and its supports.

Apparatus and methods for fatigue testing of strip and similar material have generally rigidly fastened one or both ends of the test specimen with the result that the section of the specimen undergoing the bending stress has also been subjected to compression and tension stresses during each bending operation or the stressed zone of the strip of material has not been limited to substantially the same section or length of a strip of the material during successful bending of the strip, so that the test has not been truly representative of the resistance of the material to bending fatigue of a particular zone of the material.

Furthermore, it has been common practice to form a waist in the strip of material in the zone where the fracture of the material is desired. The provision of such a waist in the test specimen generally assures repeated bending of the strip of material at the waist portion, since this portion of the strip of material is normally weaker than the remainder of the material. Such a test requires the additional work of forming a waist in the test specimen and, in addition, results in a test of a strip of material which is different from the material as it comes out of regular production. The results of tests on strips of material formed with waists are not, therefore, truly representative of the fatigue resistance to be expected in a standard production strip of the material tested.

It is desirable that fatigue tests should be conducted on strips of material selected at random from regular production in order to assure that the tests will be truly representative of material in regular production. It is also highly desirable that the section of the strip undergoing tests be limited to a predetermined test zone which is a predetermined length of the strip in order to obtain an accurate measurement of the resistance of the material to repeated bending stresses. It also is desirable that the degree of bending and the speed at which the specimen is bent should be maintained substantially uniform so that comparison of the tests of different samples can be made with an assurance that the test conditions were substantially the same for different test specimens.

In carrying out the improved method of testing a specimen of material according to this invention, the specimen is supported adjacent to the section of the material to be bent and this support allows relative longitudinal movement between the specimen and the support during the bending operation. This bending operation is carried out by repetitively oscillating the supports of the specimen in a manner so as to fold the ends of the specimen towards each other and preferably alternately to opposite sides of a centrally aligned straight condition and back again to the straight condition while providing for centering of the specimen on its supports. If desired, a specimen can be bent repetitively only to and from one side of a straight condition.

Preferably apparatus for carrying out this improved testing method includes relatively rotatable members for gripping the test specimen arranged adjacent to the section of the strip to be bent. These gripping members conveniently may be in the form of sets of rollers, each including two pairs, arranged one set on each side of the test zone of the specimen. The pairs of rollers in each set are supported resiliently biased towards each other so as to facilitate the insertion of a test specimen therebetween and to provide for resiliently gripping the test specimen therebetween. One pair of rollers or all rollers may be formed with a retaining groove therein which forms a guide for maintaining a test specimen substantially centered between the sides of the rollers.

In addition, guiding elements may be provided for centering the test specimen on the rotatable supports and stops provided adjacent to the outer edges of sets of rollers which allow for a small amount of clearance between the ends of a test specimen and the stops when the test specimen is in centrally aligned straight condition. This assures the stressing of the strip of material at a predetermined test zone and provides against the introduction of additional stresses into the test specimen due to tension or compression thereof resulting from the manner in which it is supported on the test apparatus. Furthermore, the specimen is stressed uniformly preferably by providing for equal and opposite oscillation of the two sets of rollers to opposite sides of the centrally aligned straight condition, and providing for the same degree of oscillation during each bending operation. Various means for resiliently biasing the rolls towards each other and for oscillating the sets of rollers can be provided, as well as various arrangements for counting the number of times that a specimen is bent and providing for its proper centering upon its supports while undergoing stress.

An object of this invention is to provide an improved fatigue testing apparatus.

Another object of this invention is to provide an improved and simplified apparatus for testing the resistance of strip material to bending stress in which the test specimen is supported by a mounting structure which allows relative longitudinal movement between the specimen and the mounting structure and provides for maintaining the specimen substantially centered on its support.

A further object of this invention is to provide an improved apparatus for testing a specimen of material for fatigue to bending stress which provides for alternately bending the specimen of material undergoing stress substantially equally on opposite sides of a centrally aligned straight condition at a substantially uniform rate and providing guides for assuring the stressing of a predetermined test zone of the specimen.

Still another object of this invention is to provide an improved method of testing a specimen of material for fatigue to bending stress by folding the ends of the specimen towards each other alternately to opposite sides of a centrally aligned straight condition while allowing relative longitudinal movement between the specimen and its support during the bending operation.

Further objects and advantages of this invention will become apparent from the following description referring to the accompanying drawings, and the features of novelty which characterize this invention will be pointed out with particularity in the claims appended to and forming a part of this specification.

Referring to the drawings, an embodiment of an improved and simplified apparatus for fatigue testing a specimen of strip material by repeated bending of the material is shown in FIGS. 1-5. In this connection the improved method of testing a specimen for fatigue to bending stress is carried out providing for driving the testing apparatus at any desired speed which may be maintained substantially constant during a testing operation. This driving apparatus may conveniently comprise an electric motor 1 having a drive shaft 2 which is suitably mechanically connected to a set of mounting rollers for oscillatably driving such rollers. In this embodiment, this mechanical connection includes a driving pulley 3 mounted on the shaft 2 and mechanically connected by a driving belt 4 to a driven pulley 5, which is mounted upon a suitable countershaft 6 independently supported by a base 7 on a main supporting platform 8. Such a belt drive between the source of power 1 and the countershaft 6 arranged intermediate the source of power and the driven member provides a safety link in the driving connection which can yield in case the resistance of the driven member exceeds a predetermined safe operating value which might cause damage to a major element or assembly in the apparatus. The belt 4 may comprise any suitable conventional structure such as a link belt, a toothed rubber fabric belt, or any other suitable driving belt which may be readily replaced in case of damage thereto, if the driven part of the apparatus should stall for any reason, thus assuring against damage to the driven mechanism or to the electric driving motor.

The improved simple driving mechanism of this embodiment includes rotatably supporting the countershaft 6 on the base 7 and providing it with a driving connection to an eccentric plate 9 on which an eccentric pin 10 is mounted. This eccentric pin 10 forms part of the transmission for oscillating the roller mountings of the apparatus through a connecting rod 11, which is provided with a driving engagement at one end 12 thereof with the eccentric pin 10 and is formed with a driving head 13 on the other end thereof, arranged in driving engagement with a connecting pin 14, eccentrically mounted on a driving gear 15 of a pair of gears adapted to oscillatably drive the roller mountings. In order to assure a smooth operation of the gear 15 a counterbalancing weight 16 preferably is mounted on the gear 15 opposite the eccentric connecting pin 14.

Figure 1:
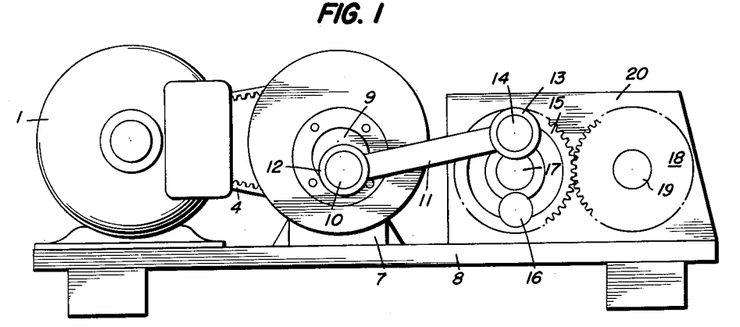
FIG. 1 is an elevational view of one side of an embodiment of this invention illustrating a driving mechanism for providing the desired oscillatory movement to the test specimen supporting structure.

As is more clearly shown in FIG. 1, the driving gear 15 is mounted on a suitable stub shaft 17 and is arranged in driving engagement with another gear 18 mounted on a second stub-shaft 19, and both rotatably mounted on a suitable mounting frame 20 rigidly secured to the main supporting platform 8. As can best be seen from this figure, rotation of the motor driving pulley 3 will drive the eccentric pin 10 eccentrically about the axis of the countershaft 6 and cause the connecting pin 14 to oscillate between a centered position as shown in FIG. 1, and two extreme positions of swing to the right and left of the position shown in this figure. The throw of the connecting pin 14 during this oscillation is always exactly the same as it is determined by the eccentric movement of the eccentric pin 10, thus assuring a repetition of exactly the same oscillatory movement of the gear 15 by this driving mechanism.

The gears 15 and 18 are made the same size with the same size and pitch of gear teeth thereon so that movement of the gear 15 will be exactly oppositely reflected in a synchronously opposite movement of the gear 18. This exact synchronous opposite movement of the gears 15 and 18 is assured by providing a direct meshing of the teeth of these two gears so that the oscillatory movement of the gear 15, as driven by the connecting pin 14, is synchronously oppositely reflected by the movement of the meshed gear 18.

The stub-shafts 17 and 19 are suitably rotatably mounted in the mounting frame 20 and extend through this mounting frame for synchronously driving the mountings of roller members which are adapted to support a test specimen for fatigue testing it in accordance with this invention. A test specimen of material 21 is adapted to be supported in a manner allowing relative longitudinal movement between the specimen and the supporting member during the fatigue bending test of the specimen, so as to prevent binding between the specimen and its support and so as to minimize frictional forces therebetween and avoid the exertion of tension or compression upon the section of the specimen submitted to the bending stress. This mounting of the test specimen 21 includes substantially identical mounting members arranged in spaced apart relationship on which the test specimen is supported with the test zone thereof located substantially midway between the mounting members. Each of the two mounting members includes a set of two pairs of rollers which are adapted to be resiliently biased towards each other for gripping the test specimen and yet allowing it to move longitudinally relative thereto during the bending of the specimen.

Figure 3:
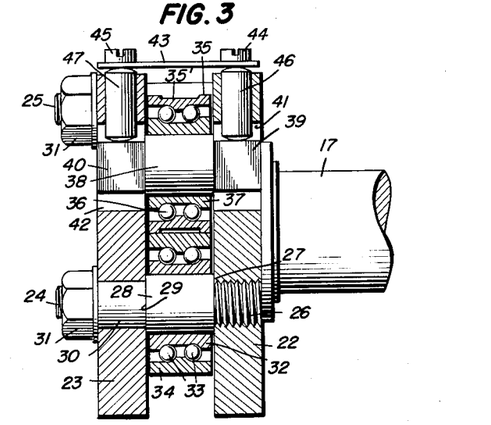
FIG. 3 is an enlarged sectional view taken along line 3—3 of FIG. 2, with the test specimen removed from between supporting rollers.

As is more clearly shown in FIG. 3, the stub-shaft 17 is rigidly secured to a rear mounting plate 22, which is secured to and spaced from a second mounting plate 23 by studs 24 and 25. These studs all are formed alike and are provided with a threaded end 26 which threadedly engages an opening in the mounting plate 22 into which the studs are adapted to be screwed tightly until a shoulder 27 engages the outer face of the mounting plate 22 thereby securely positioning each of the studs relative to the mounting plate 22. Each stud is formed with a central collar portion 28 which extends from the shoulder 27 to a second shoulder 29. The outer mounting plate 23 is formed with apertures therein which are adapted to be arranged over a reduced neck portion 30 on the studs with the inner surface of the mounting plate 23 in engagement with the shoulder 29. Suitable nuts 31 threadedly engage the outer ends of the studs and rigidly secure the outer mounting plate 23 in position on the studs in desired spaced relationship to the inner mounting plate 22, so as to provide a rigid mounting frame for the rollers, which is adapted to be driven by the stud-shaft 17. A similar mounting frame structure is provided for the other set of rollers and is mounted in driving engagement on the other stub-shaft 19. This assures an exact synchronous movement of the mounting frames for the two sets of rollers.

The rollers which are adapted to support the test specimen may conveniently take the form of outer races of suitable bearings such as ball, roller, pin, or similar bearings. One pair of each set of rollers may conveniently be mounted upon the two studs 24 and may conveniently be in the form of ball bearings, as shown in FIG. 3, in which inner races 32 are mounted on the collar 28 of the studs 24 and ball bearings 33 rotatably support outer races 34, which form the lower pair of rollers in the righthand set of rollers shown in FIGS. 2, 4, and 5. This mounting of these rollers provides a fixed axis for the rollers relative to the mounting plates 22 and 23.

The other pair of rollers of this set may conveniently comprise an outer race 35 rotatably supported on suitable ball bearings 36 mounted upon an inner race 37 and adapted to be resiliently biased towards the pair of rollers 34. In order to provide for the insertion of a test specimen between the pairs of rollers 34 and 35, the rollers 35 are mounted upon stub shafts 38 which are formed with substantially rectangular end guide portions 39 and 40 slidably arranged within guide slots 41 and 42, respectively, in the mounting plates 22 and 23. This provides for relative movement of the rollers 35 towards and away from the rollers 34, so as to allow for the insertion and removal of test specimens between the adjacent sides of these rollers. The rollers 35 are resiliently biased towards the rollers 34 by a spring plate 43, which is secured by suitable screws 44 and 45 to the mounting plates 22 and 23, respectively. The ends of the spring plate 43 engage the outer ends of biasing pins 46 and 47 slidably arranged within passages in the plates 22 and 23, respectively, and arranged with the inner ends thereof in engagement with the guide portions 39 and 40 of the stub shafts 38, whereby the biasing force of the ends of the spring 43 is transmitted through the pins 46 and 47 to the guide portions 39 and 40 for resiliently biasing the rollers 35 towards the rollers 34. Both sets of rollers and mounting frames are substantially identical and, if preferred, one set may be arranged with the relatively movably mounted rollers 35 on the opposite side of the test specimen 21 from the corresponding rollers in the other set, as is shown in FIGS. 2, 4, and 5.

Each of the roller mounting frames is provided with a suitable stop member, which is shown as a U-shaped plate 48 secured to the mounting plates 22 and 23 by suitable screws 49 and extending between the outer edges of these plates over a line passing through the line of contact between the pair of rollers 35 and the pair of rollers 34.

Figure 2:
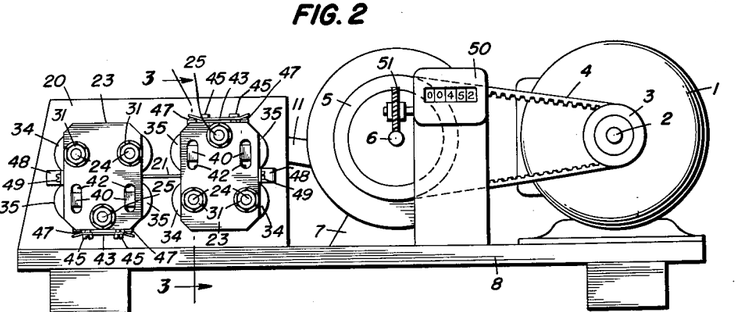
FIG. 2 is an elevational view of the other side of the test apparatus shown in FIG. 1.
Figure 5:
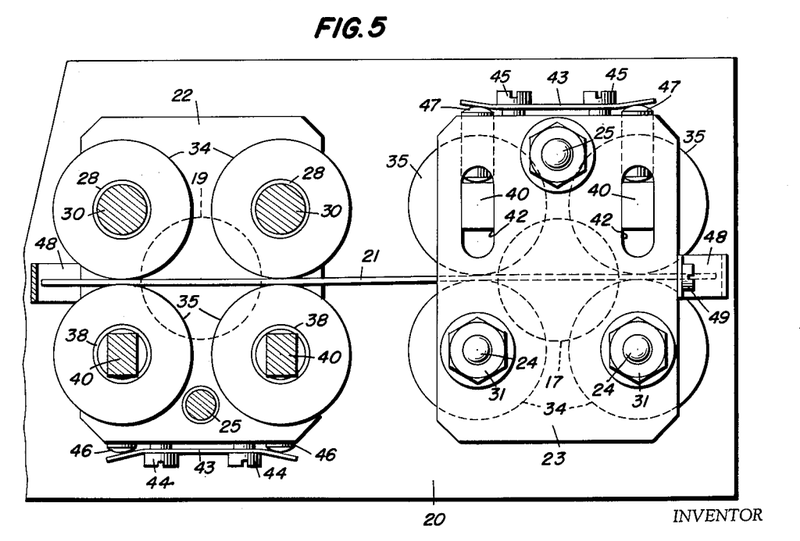
FIG. 5 is an enlarged side elevational view, similar to that of FIG. 4, showing the sets of rollers in centrally aligned position and illustrating the relative position of the roller mountings and a test specimen under this condition.

Insertion of a test specimen into the apparatus may conveniently be done by removing one of the stop plates 48 and passing the test specimen 21 between the rollers of each set into the position shown in FIGS. 2 and 5. The length of a test specimen preferably should be just slightly less than the distance between the inner sides of the stop plates 48, as shown in FIG. 5, when the rollers and mounting frames are centrally aligned. This assures against interference of the stops 48 with the proper operation of the apparatus, and the stops 48 act to maintain the test specimen substantially centrally located on the supporting rollers and prevent accidental longitudinal displacement of the test specimen from its mounting on the rollers. This arrangement of the test specimen 21 between the rollers 34 and 35 and between the mounting plates 22 and 23 assures against sidewise accidental displacement of the test specimen. In order further to assure proper centering of the test specimen 21 and in order to minimize frictional forces on the test specimen, the rollers 35 may be formed with a groove 35' on the outer surfaces thereof which will tend further to center a test specimen axially of the rollers and retain the specimen out of engagement with the mounting plates 22 and 23.

Figure 4:
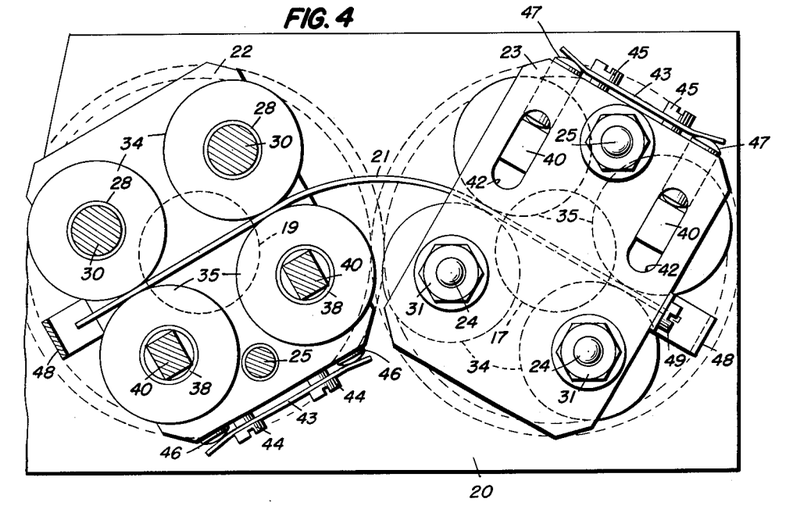
FIG. 4 is an enlarged side elevational view of the rollers shown in FIG. 2, with one of the guide plates removed, and showing the roller mountings oscillated in one direction from an aligned central position, illustrating the uniform bending of a test specimen therein.

In carrying out the improved method of fatigue testing of a specimen in accordance with this invention, the mounting frames are adapted to be repetitively synchronously oscillated in opposite directions away from a centrally aligned straight position, as shown in FIGS. 2 and 5, in a manner folding the ends of a specimen towards each other and bending the test specimen evenly on both sides of the center thereof, as is more clearly shown in FIG. 4, and returning it to its centrally aligned straight position. In this embodiment of the invention, the specimen is adapted to be bent equally on both sides of the centered position; that is, the ends thereof are adapted to be bent towards each other downwardly, as shown in FIG. 4, and similarly bent to the same degree upwardly, as viewed in this figure. This provides for a uniform straining of the specimen in both directions. If desired, the throw of the eccentric plate 9 and the eccentric pin 10 may be made such that a specimen would be bent only in one direction from its centrally aligned straight condition.

In order to determine the results of this test, a suitable counter 50 is provided for counting the number of times that a specimen is bent from its initial straight condition to its bent condition until it is fractured. As shown in FIG. 2, the counter 50 may conveniently be connected to the counter shaft 6 by a suitable gearing 51 and be calibrated to measure the number of times the specimen is bent during the test. This construction provides for effectively assuring a uniform operation of the fatigue testing of a specimen by a relatively simple structure, which is easily operated for the insertion and removal of a test specimen and is provided with a safety driving arrangement for minimizing damage to the testing apparatus.

Figure 6:
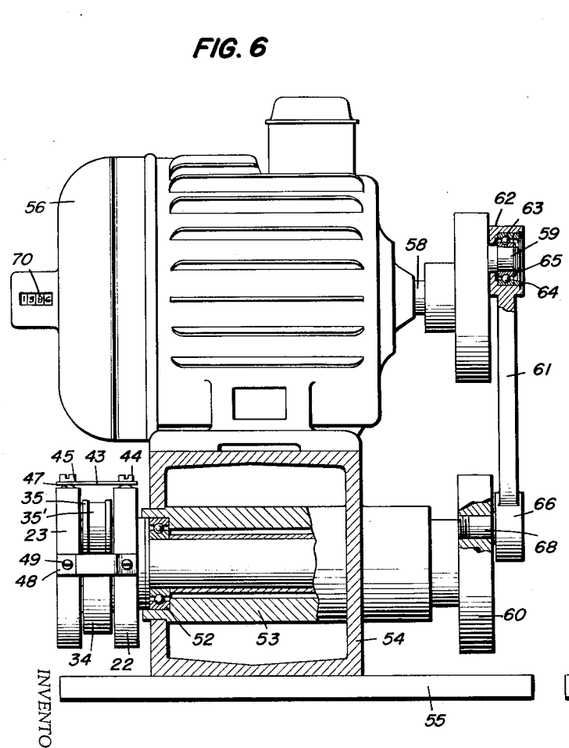
FIG. 6 is a side elevational view, partly in section, illustrating another embodiment of an improved fatigue testing apparatus incorporating this invention.
Figure 7:
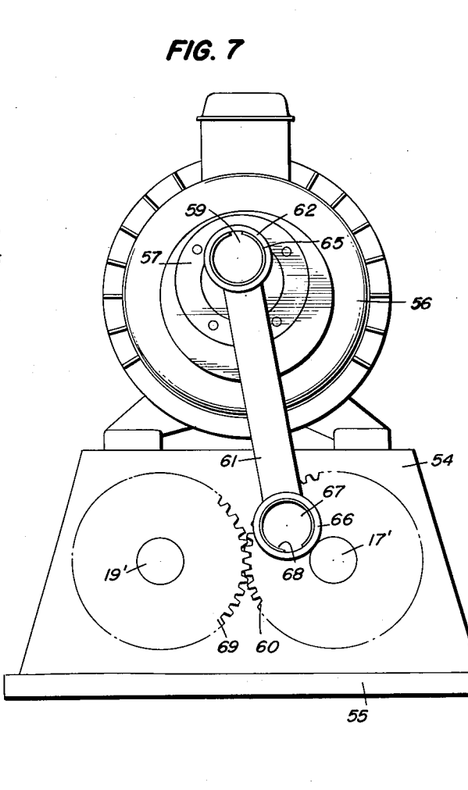
FIG. 7 is an end elevational view illustrating the driving mechanism of the apparatus shown in FIG. 6.

Another embodiment of this invention is illustrated in FIGS. 6 and 7, in which the rollers and their mounting members for successively reversibly bending a strip of material undergoing test are substantially the same as those illustrated in FIGS. 2–5. In this construction the inner mounting plates 22 are secured to the ends of drive shafts 17' and 19', which correspond to the driving stub shafts 17 and 19 of the previously described embodiment of this invention. In this construction, the shafts 17' and 19' are rotatably supported by suitable bearings 52, which are mounted in supporting sleeves 53 in a supporting base 54, which is integrally formed as part of a main supporting platform 55.

The drive of the apparatus is provided by a suitable electric motor 56 which is mounted on the top of the supporting base 54. This construction utilizes a more compact driving arrangement than that in the previously described embodiment and includes an eccentric plate 57 having a driving connection with the motor shaft 58 and is provided with an eccentric pin 59, which is mechanically coupled to a gear 60 through a connecting rod 61. The connecting rod 61 is formed with a coupling end 62 secured to the eccentric pin 59 and rotatably mounted thereon by suitable bearings, such as ball bearings 63, which are suitably secured to the end 62 of the connecting rod by a retaining ring 64 and to the eccentric pin 59 by a retaining ring 65. The other end of the connecting rod 61 is mechanically connected to the gear 60 by a driving head 66, which is mechanically secured in any suitable manner, as by retaining ring 67, to an eccentric connecting pin 68 and is rotatable relative thereto.

In this construction, rotation of the motor shaft 1 and of the eccentric plate 57 provides for the oscillation of the connecting pin 68 equally on both sides of a horizontal center line through the shafts 17' and 19', as viewed in FIG. 7, and thus provides for repetitively oscillating the gear 60 equally on both sides of a predetermined central position. The gear 60 is arranged in mesh with a gear 69, drivingly mounted on shaft 19', whereby oscillations of the gear 60 produce correspondingly equal and opposite oscillations of the gear 69. In this manner, operation of the motor 56 provides for regular equal and opposite synchronous oscillation of the gears 60 and 69 and therefore of the shafts 17' and 19', respectively, with which these gears have driving connections.

As in the previously described embodiment of this invention, the oppositely oscillating drive of the shafts 17' and 19' provide for oppositely oscillating the mounting frames, comprising the mounting plates 22 and 23 and similarly oppositely oscillating the rollers 34 and 35 for successively reversibly bending a strip of material undergoing test. As in the previously mentioned construction, this provides for gripping the test specimen and allowing for relative longitudinal movement between the specimen and the mounting rollers 34 and 35 so as to minimize the effect of forces upon the test specimen other than those producing a bending stress as a result of the oscillation of the mounting frames. This construction provides a more direct drive of the oscillating frames by the primary source of motive power and is a more compact structure than that illustrated in FIGS. 1 and 2 and may be found desirable for certain applications. A suitable counter 70 on the motor shaft may be used to register the number of times a test specimen is bent from its initial straight position until it is fractured and thus indicate the resistance of the specimen to fatigue by bending stress.

FIGS. 8–11 illustrate a third embodiment of this invention in which the mounting frames for the roller supports of a test specimen are mounted for oscillation about a common axis and are adapted to be individually driven directly by a pair of connecting rods mechanically operable by a source of mechanical power. In this construction, the source of power is illustrated as comprising a suitable electric motor 71 mounted upon a main supporting base 72 and provided with a drive shaft 73 for supplying power to a suitable eccentric driving mechanism.

Figures 8, 9:
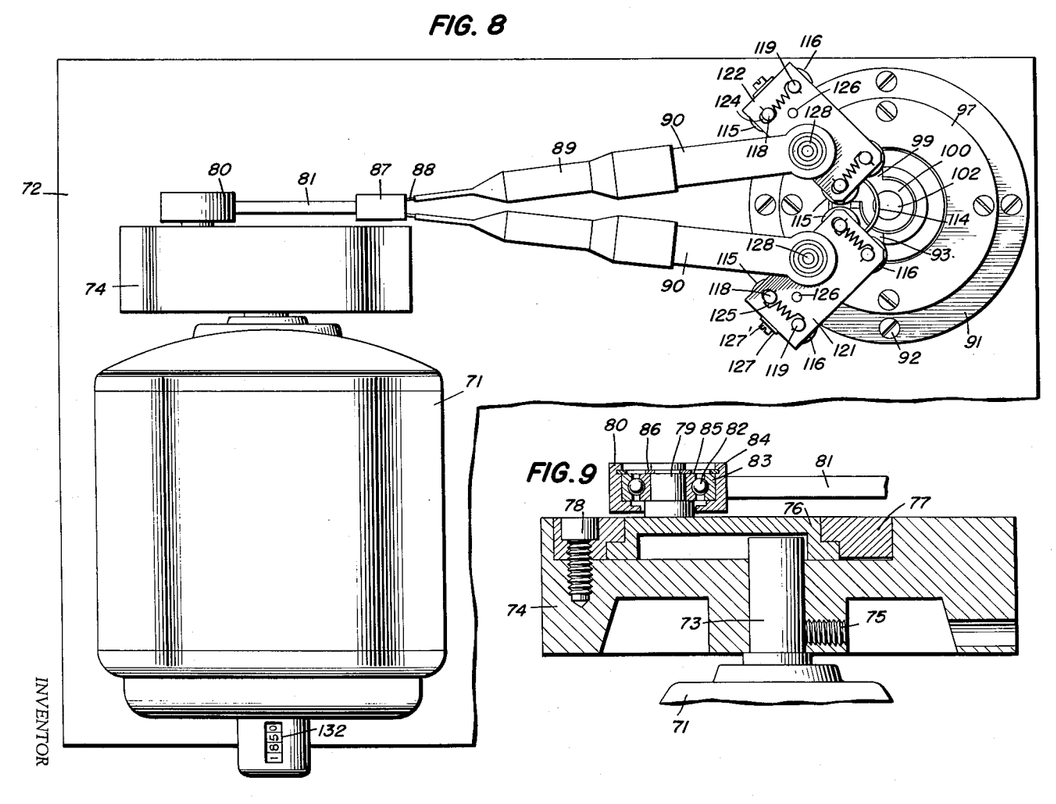
FIG. 8 is a plan view of a third embodiment of an improved fatigue testing apparatus, embodying this invention, in which the roller mountings are oscillatably mounted about a common axis.
FIG. 9 is an enlarged sectional view through the eccentric driving connection of a suitable source of power to a connecting rod for driving the oscillatable sets of mounting rollers in an apparatus such as that shown in FIG. 8.
Figure 10:
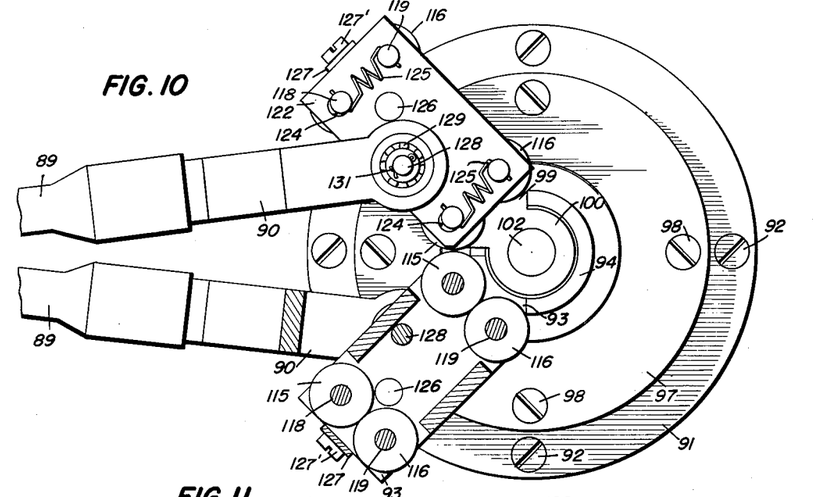
FIG. 10 is an enlarged plan view, partly broken away, of the oscillating roller mounting and the respective ends of the connecting rods of the apparatus shown in FIG. 8, illustrating the details of the roller mountings.
Figure 11:
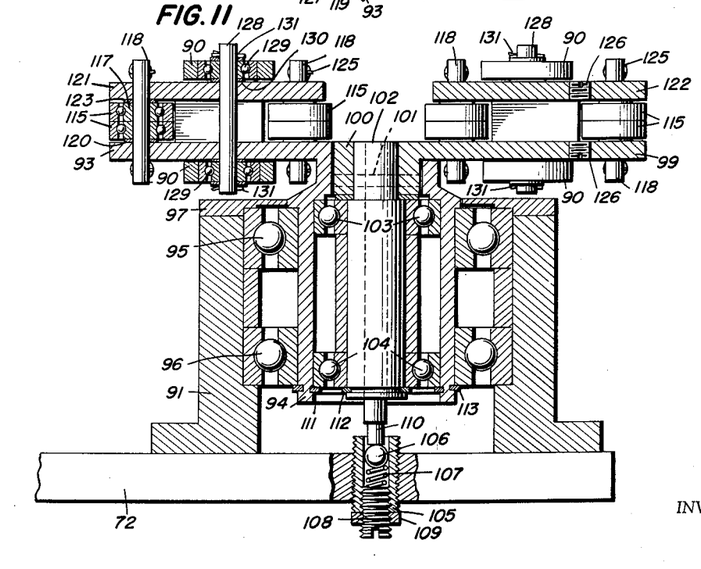
FIG. 11 is a sectional view through the oscillating roller mountings shown in FIGS. 8 and 10, with the rollers in centrally aligned position and with the set of rollers on the lefthand side partly in section along a plane through the axis of one of the rollers and the axis of the mounting pin for the connecting rod, illustrating the connections of these elements to the roller mounting structure.

The eccentric mechanism includes a balance wheel 74 mounted on the motor drive shaft 73 and drivingly secured thereto in any suitable manner, as by a set screw 75 (as best shown in FIG. 9). A suitable eccentric plate 76 is mounted on the outer face of the balance wheel 74 and is secured thereto by a retaining ring 77 fastened to the balance wheel in any suitable manner, as by screws 78. The eccentric plate 76 is provided with an eccentric pin 79, which is secured to an end 80 of a main connecting rod 81. The connection of the main connecting rod 81 to the eccentric pin 79 is formed through a suitable ball bearing 82, having an outer race 83 secured to the connecting rod end 80 by a retaining ring 84 and having an inner race 85 secured to the eccentric pin 79 by a retaining ring 86. This provides for relative rotation of the eccentric pin 79 within the end 80 of the main connecting rod 81, so that rotation of the motor drive shaft 73 will transmit a longitudinally reciprocating movement to the main connecting rod 81 through the eccentric plate 76 and eccentric pin 79.

The reciprocating movement of the main connecting rod 81 is adapted to be translated into a synchronous oscillating movement of two mounting frames, on which two sets of rollers are mounted, through a flexible connection which provides for a combined reciprocation and pivoting of rocker arms which transmit the driving force to the mounting frames from the main connecting rod 81. This construction includes a driving head 87, on the main connecting rod 81, to which a pair of flexible leaf springs 88 are secured for providing a desired pivoting connection between the main connecting rod 81 and rocker arms 89. Each rocker arm 89 also is provided with a clevis 90 secured to the outer end thereof for transmitting the driving force from the motor 71 to one of the roller mounting frames.

In this embodiment, the mounting frames are adapted to oscillate about a common vertically extending axis and the test specimen is adapted to be supported on an edge thereof rather than upon the rollers, thereby minimizing frictional forces between the rollers and the test specimen, since the weight of the specimen is removed from the rollers. In order thus to support a test specimen and to deflect the test specimen equally and simultaneously from a central straight condition to both sides of the central straight condition, a pair of mounting frames is provided similar to that in the previously described apparatus embodying this invention.

The mounting for the test specimen includes two sets of two pairs of rollers, each set of which is rotatably supported upon a separate mounting frame. These mounting frames are supported upon the main base 72 by suitable bearings and include a frame support 91 secured to the main base 72 in any suitable manner, as by screws 92. One of these frames includes a lower mounting plate 93 formed with a tubular hub 94, which is rotatably supported within the frame support 91 by upper and lower bearings 95 and 96. A suitable cover plate 97 is secured by screws 98 to the upper edge of the frame support 91 and extends over the upper bearing 95 and has a close clearance with the outer surface of the hub 94. The other mounting frame is also provided with a lower mounting plate 99 which is formed with a tubular hub 100 having a smaller diameter than the hub 94 and arranged to fit within an end of the hub 94 for oscillation coaxially therewith. The tubular hub 100 is secured by a pin 101 to an end of a mounting shaft 102, which is rotatably mounted within the tubular hub 94 by upper and lower bearings 103 and 104.

In order to support the weight of the mounting plates and the rollers with a minimum of frictional resistance, a resiliently mounted thrust ball bearing structure is provided. This structure includes an adjustable tubular bearing race 105, which is screw threaded into the main mounting base 72 and is provided with a single thrust ball bearing 106 resiliently mounted in the tubular race 105 on a suitable coil spring 107. This coil spring 107 is adjustably supported on a spring seat 108 screw threaded into the outer end of the tubular race 105 and adapted to be locked in adjusted position by a suitable lock nut 109. The weight of the mounting frames and rollers is transmitted to the resiliently mounted thrust bearing 106 through the shaft 102, which is formed with an axially extending neck 110 arranged in engagement with the bearing 106 and adapted to extend into the upper end of the tubular bearing race 105. In this manner the weight of the mounting frame, including the mounting plate 99 and its associated rollers, is transmitted directly through the pin 101 to the shaft 102 and to the thrust bearing 106.

The weight of the other mounting frame, including the mounting plate 93 and its asociated rollers, is transmitted to the trust bearing 106 through the tubular hub 94 and the lower bearings 104 and retaining rings 111 and 112, which secure the races of the bearings 104 to the tubular hub 94 and to the shaft 102, respectively. An outer retaining ring 113 is secured to the lower outer edge of the tubular hub 94 for supporting and locating the inner race of the bearing 96. In this manner all of the weight of the mounting frames and their associated rollers, as well as a part of the weight of the clevises 90 and their associated driving mechanisms, is resiliently supported upon the thrust ball bearing 106 and its coil spring 107.

The improved method of testing a specimen of material for fatigue to bending stress, according to this invention, is carried out in this embodiment of the apparatus by supporting a specimen between two sets of two pairs of rollers, with the rollers of each pair in longitudinal alignment on synchronously oscillatable mounting frames. As in the previously described embodiments, a specimen of strip material 114 is arranged between the pairs of rollers of each set and is resiliently gripped between the pairs of rollers 115 and 116. These pairs of rollers 115 and 116 may conveniently be formed as ball, roller, pin, or other similar bearings, in which inner races 117 are mounted on shafts 118 and 119 and outer races of these bearings form the outer specimen engaging portions of the rollers 115 and 116. These rollers may each conveniently be formed of two sets of bearings and the inner races thereof preferably are spaced from the lower mounting plates 93 and 99 by suitable washers 120 and spaced from upper mounting plates 121 and 122 by suitable washers 123. The shafts 119 for the rollers 116 are mounted in apertures formed in the mounting plates 93, 99, 121, and 122, and the shafts 118 for the rollers 155 are mounted in slots 124 extending transversely of the outer mounting plates to provide for movement of the rollers 115 transversely of the mounting plates relative to the rollers 116 of each set of rollers, so that a test specimen may be inserted between the different pairs of rollers. In order to provide for properly gripping the test specimen between the pairs of rollers, these pairs of rollers are biased towards each other in any suitable manner, as by tension coil springs 125, which are suitably secured to the ends of the shafts of adjacent rollers of different pairs of rollers.

In order to minimize frictional forces upon a test specimen mounted between the rollers 115 and 116, supporting set screw spacers 126 extend through each of the mounting plates substantially along the longitudinal center line thereof and are adapted to be screwed inwardly a slight distance from the inner surfaces of the mounting plates so as to support a test strip of material on the inner faces of the set screw spacers and out of contact with the inner faces of the mounting plates. In order further to assure a proper centering of the test specimen and to assure stressing of a predetermined test zone of the specimen during the repeated bending thereof, suitable stops in the form of plates 127 extend across the outer edges of the mounting plates transversely thereof and substantially along the central portion of these edges. These stop plates 127 may be secured to the mounting plates in any suitable manner, as by screws 127', and the distance between the stop plates 127, when the mounting frames and rollers are arranged in centrally aligned position, should be such as to afford only a slight clearance between the inner sides of the stop plates 127 and the outer edges of a test strip of material.

A test strip of material is adapted to be repetitively subjected to bending stress by oscillation of the mounting frames about their coaxial mounting on the shaft 102. The oscillation of the mounting frames is provided by arranging the clevises 90 on the ends of the rocker arms 89, around the outer faces of the mounting frames and providing a driving connection therebetween through connecting pins 128, which extend through the mounting plates and are rotatably connected to the clevises through suitable bearings, such as ball bearings 129, arranged between the connecting pins 128 and the ends of the arms of the clevises 90. The bearings 129 preferably are spaced from the outer surfaces of the mounting frames by suitable washers 130 and secured in position on the connecting pins 128 in any suitable manner, as by cotter pins 131. In this manner the driving motor 71 is adapted to oscillate the mounting frames and the sets of rollers 115 and 116 mounted thereon substantially equally to both sides of a centrally aligned position at a substantially uniform speed, and thus repetitively to bend a test specimen evenly to each side of an initial straight condition and back to a straight condition at a substantially uniform speed.

In order to measure the resistance of such a test specimen to the fatigue to which it is subjected by such a bending operation, a suitable counter is adapted to measure the number of times the test specimen is bent from and returned to a straight condition until it is fractured. Such a counter 132 may conveniently be mounted on the motor 71 and be driven by the motor shaft 73 to indicate the number of times which the specimen is bent.

While particular embodiments of this invention have been illustrated and described for carrying out the improved method of fatigue testing of material, modifications thereof, and of the various details of each embodiment, will occur to those skilled in the art. It is to be understood, therefore, that this invention is not to be limited to the particular arrangements disclosed and it is intended in the appended claims to cover all modifications within the spirit and scope of this invention.

I claim:

1. A fatigue testing machine for testing a strip comprising, a pair of strip holding assemblies positioned respectively to receive the two ends of a strip to be tested with the central portion of the strip being positioned therebetween so as to be subjected to the fatigue testing operation, each of said assemblies including two pairs of rollers formed by a pair of ball bearing units positioned with their axes parallel and with each pair adapted to resiliently hold its strip end and with the two pairs being in longitudinal alignment along the strip, two pairs of shafts providing separate mounting means for said assemblies and comprising means forming separately oscillatable pivot mountings for said assemblies with the pivotal axis for each of the assemblies being within the longitudinal extent of the strip being tested, spring means acting upon one shaft of each of said pairs to urge the roller carried thereby toward the other roller of that pair of rollers, and means to oscillate said assemblies oppositely and simultaneously through a series of oscillations during each of which the assemblies move the central portion of the strip from a central position first to one side of said central position and back to said central position and thence to the other side of said central position and back to said central position.

2. A machine as described in claim 1, wherein said spring means comprises a pair of leaf springs mounted respectively upon said assemblies and having free ends which are resiliently urged toward the respective ends of said shafts, two pairs of pressure pins mounted respectively beneath the ends of said leaf springs and transmitting resilient forces against the shaft ends, and screw adjusting means holding said springs in place.

3. A machine as described in claim 1, wherein said means to oscillate said assemblies comprises, a pair of shafts rotatably mounted with fixed parallel axes, a pair of meshing gears mounted respectively upon said shafts and means attaching the ends of said shafts respectively to said assemblies.

4. A machine as described in claim 3 which includes, a crank arm attached to one of said gears, an eccentric drive attached to said crank arm and adapted to impart oscillatory movement thereto, and a motor drive assembly to drive said eccentric drive.

5. A machine as described in claim 4, wherein said motor drive assembly comprises an electric motor, a countershaft assembly providing a mounting for said eccentric drive and a belt driving said countershaft assembly.

References Cited in the file of this patent

UNITED STATES PATENTS

| | | |
|---|---|---|
| Re. 22,416 | Eksergian | Jan. 11, 1944 |
| 1,819,990 | Stevens | Aug. 18, 1931 |
| 2,032,989 | Kenney et al. | Mar. 3, 1936 |
| 2,350,722 | Buckingham | June 6, 1944 |
| 2,545,816 | Koester et al. | Mar. 20, 1951 |

FOREIGN PATENTS

| | | |
|---|---|---|
| 632,286 | Germany | July 6, 1936 |